(12) United States Patent
Tang (10) Patent No.: US 8,134,109 B2
(45) Date of Patent: Mar. 13, 2012

(54) OPTICAL PROJECTION ENGINE DEVICE HAVING A POLARIZING BEAM SPLITTER AND A CONTROL PROVIDING MODULATION INSTRUCTIONS TO MODULATION IMAGERS

(75) Inventor: Deming Tang, Shanghai (CN)

(73) Assignee: Shanghai Lexvu Opto Microelectronics Technology Co., Ltd., Shanghai (CN)

(*) Notice: Subject to any disclaimer, the term of this patent is extended or adjusted under 35 U.S.C. 154(b) by 341 days.

(21) Appl. No.: 12/613,209

(22) Filed: Nov. 5, 2009

(65) Prior Publication Data

US 2010/0110383 A1 May 6, 2010

Related U.S. Application Data

(60) Provisional application No. 61/112,090, filed on Nov. 6, 2008.

(51) Int. Cl.
*H01L 27/00* (2006.01)
(52) U.S. Cl. ............................ 250/208.1; 353/20
(58) Field of Classification Search .......... 250/208.1, 250/225, 226, 216; 353/20, 33, 81, 85, 34; 359/485–488, 494–497; 349/7–9
See application file for complete search history.

(56) References Cited

U.S. PATENT DOCUMENTS

| 5,153,752 A * | 10/1992 | Kurematsu et al. | 349/9 |
| 5,912,762 A | 6/1999 | Li et al. | 359/352 |
| 5,982,541 A | 11/1999 | Li et al. | 359/497 |

* cited by examiner

Primary Examiner — Que T Le
(74) Attorney, Agent, or Firm — J.C. Patents (57) ABSTRACT

An optical projection engine device uses a symmetrical wire grid polarizing beam splitter (PBS) that splits incident illumination to a symmetrical pair of polarized light beams in two orthogonal polarization states, one by reflection and the other by transmission, for illuminating a pair of reflective modulation imagers respectively. In identical geometric configuration, the two synchronized reflective modulation imagers polarization modulate polarized light beams as received, and reflect them back towards the PBS, which through transmission and reflection respectively, combines and projects two modulated light beams through a projection lens system to form a pair of spatially overlapped illumination images of aligned pixels with the same image in two orthogonal polarization states on a projection screen. The device jointly provides improvement optical efficiency and expanded function to three dimensional stereoscopic displays.

15 Claims, 6 Drawing Sheets

OPTICAL PROJECTION ENGINE DEVICE HAVING A POLARIZING BEAM SPLITTER AND A CONTROL PROVIDING MODULATION INSTRUCTIONS TO MODULATION IMAGERS

CROSS-REFERENCE TO RELATED APPLICATIONS

This application claims priority of provisional application No. 61/112,090, filed on Nov. 6, 2008, entitled "Optical Projection Engine Device", which is incorporated herein by reference in its entirety.

FIELD OF THE TECHNOLOGY

The present invention is related to microdisplay projection systems, and more particularly to an optical projection engine device employing reflective microdisplay imagers and polarizing beam splitter.

BACKGROUND

Microdisplay projection systems typically employ a transmissive or a reflective microdisplay imager, commonly referred to as a light valve or light valve array, which imposes an image on an illumination light beam. One of the important advantages on reflective light valves over transmissive light valves is that reflective light valves permit controlling circuitry to be placed behind the reflective surface, and more advanced integrated circuit technology is available because the substrate materials are not limited by their opaqueness.

Reflective liquid-crystal-on-silicon (LCOS) imagers rotate the polarization of incident light. Thus, polarized light is either reflected by the imager with its polarization state substantially unmodified, or with a degree of polarization rotation imparted to provide a desired grey scale. Accordingly, a polarized light beam is generally used as the input beam for reflective LCOS imagers, while a polarizing beam-splitter (PBS) is typically employed for splitting the incoming light beam to two polarized light beams in orthogonal polarization states.

Figure 1:
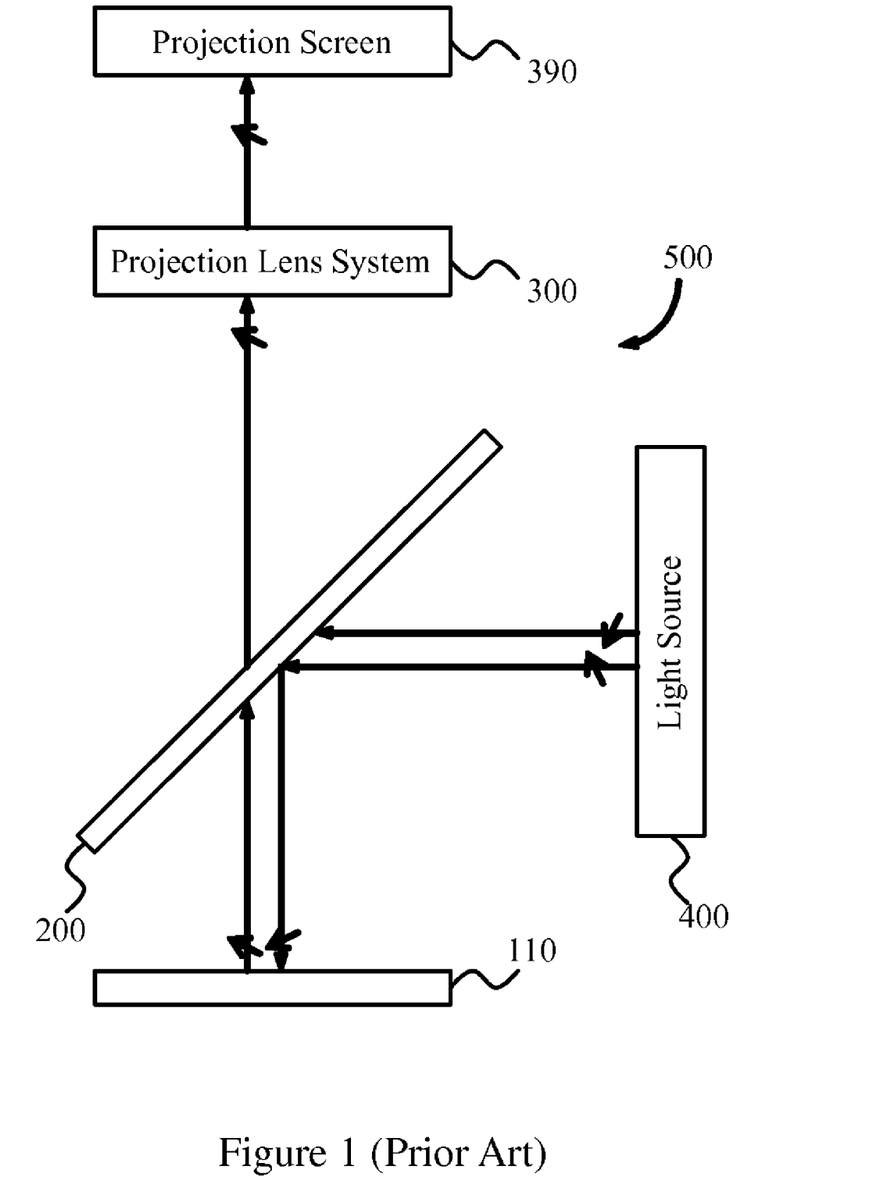
FIG. 1 illustrates an example of a simple compact projection system made of a single modulation imager and a single PBS in the prior art to the present disclosed invention.

Widely used for various portable and handheld projection display applications, a typical optical projection engine device 500 employs one LCOS modulation imager 110 and one PBS 200 in the simplest but most compact configuration, illustrated in FIG. 1. One of the most obvious drawbacks of this Cartesian optical projection engine device 500, comprising the single PBS 200 and the single modulation imager 110, is that only limited portion of illumination light in one polarization state is used for illuminating the modulation imager 110 and therefore, after modulation and reflection by the modulation imager 110, total illumination projected through the projection lens system 300 onto a projection screen 390 is limited. Besides, the PBS 200 in prior art is made of a multilayer film which often contains organic species or is made of polymeric materials and vulnerable to intensive visible and infrared radiation. Besides, such multilayer film has a narrow optical receiving angle of polarization than the wire grid polarizer.

SUMMARY

One aspect of the present disclosure is related to an optical projection engine device that includes a pair of reflective modulation imagers in association with a polarizing beam splitter (PBS) in a Cartesian symmetric configuration such that both split polarized light beams in two orthogonal polarization states by the PBS are directed towards and utilized for illuminating the two pairing reflective modulation imagers and thus generating projection image simultaneously. This optical projection engine device uses this PBS to split incident illumination light to a pair of polarized light beams in two orthogonal polarization states, one by reflection and the other by transmission, and then to illuminate a pair of reflective modulation imagers respectively. In an identical geometric configuration, the two synchronized reflective modulation imagers polarization modulate received polarized light beams, and reflect them back towards the PBS, which again by transmission and reflection respectively, combines and projects two modulated light beams through a projection lens system to form a pair of spatially overlapped illumination images made of aligned pixels in two orthogonal polarization states on a projection screen.

Another aspect of the present disclosure is the incorporation of a pair of LCOS imagers in a symmetric configuration relative to the PBS, the pairing LCOS imagers receiving, polarization modulating and reflecting the pairing polarized illumination beams in orthogonal polarization states. Another further aspect of the present disclosure is the incorporation of a pair of micro electrical-mechanical interferometric pixel array device, or galvanic light valve (GLV) array device, with help of a pair of polarization shift panels to construct the symmetric pair of modulation imagers to the PBS for achieving the same objective.

Besides the enhancement in optical efficiency by improving utilization of polarized illumination from the PBS for modulation and image formation, the advantages provided by the present disclosure also include capability of projection displaying a stereoscopic three dimension scene being projected through the projection lens system onto the projection screen, via one pair of stereoscopic images in modulation instructions being introduced to the pair of modulation imagers.

BRIEF DESCRIPTION OF THE DRAWINGS

The disclosure may be more completely understood in consideration of the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the present disclosure.

DETAILED DESCRIPTION

The present disclosure is considered to be widely applicable to various microdisplay projection systems. In particular, this disclosure is related to an optical projection engine device employing one polarizing beam splitter (PBS) and a pair of polarization modulation imagers in identical configuration but symmetric to the PBS, which jointly provides improvement optical efficiency and expanded function to three dimensional stereoscopic displays. While the present disclosure is not so limited, an appreciation of various aspects of the disclosure will be gained through a discussion of the examples provided below.

Figure 2:
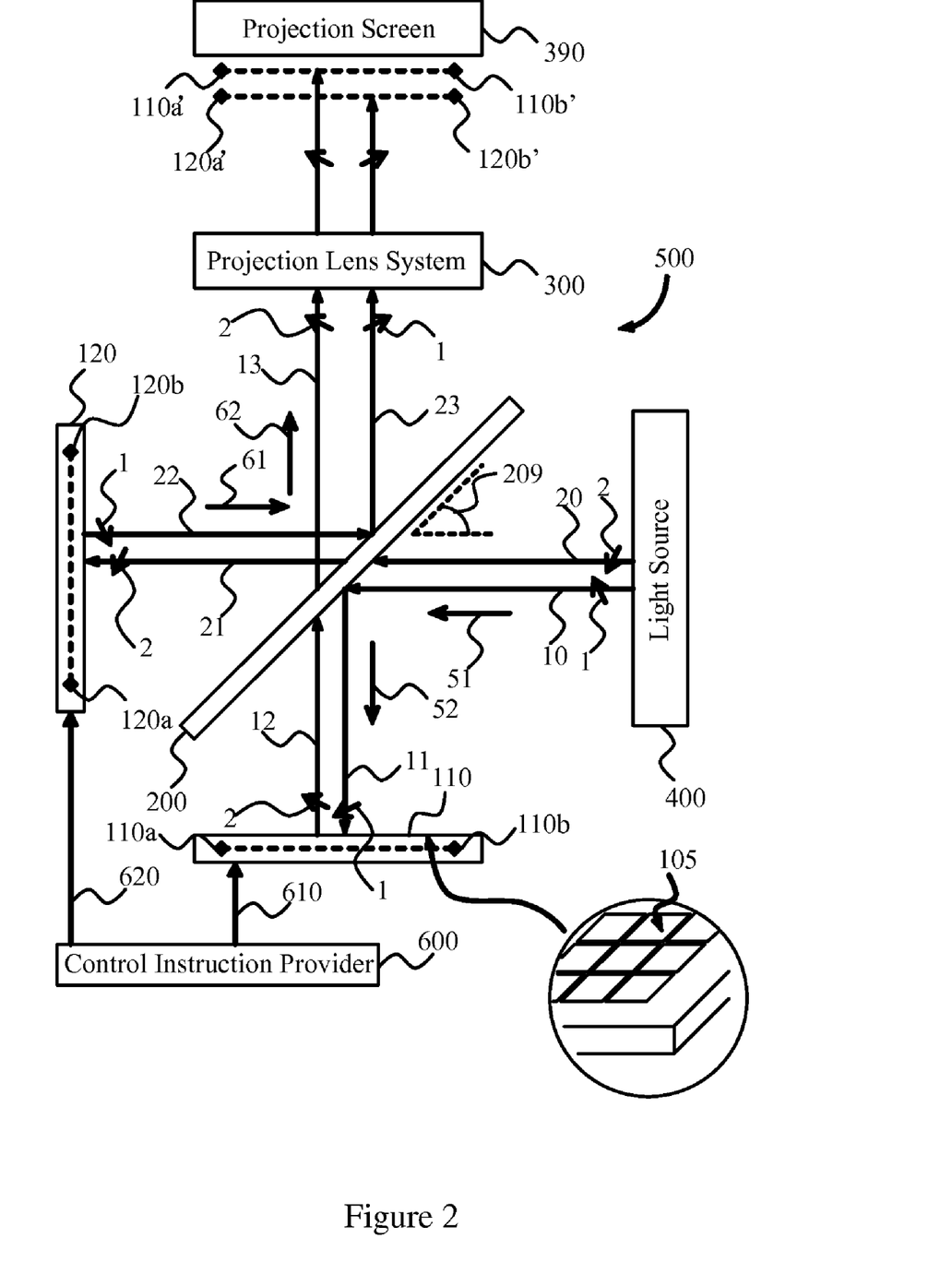
FIG. 2 illustrates a basic configuration of the optical projection engine device in Embodiment 1 of the disclosed invention.

FIG. 2 presents a basic configuration of the optical projection engine device in Embodiment 1 of the disclosed invention. The optical projection engine device 500 in a delicate configuration includes: a light source 400, a PBS 200, two pairing modulation imagers (i.e., the first modulation imager 110 and the second modulation imager 120), as well as a projection lens system 300. Inside the optical projection engine device 500, the PBS 200 is a wire grid polarizer 230, made of elongated parallel reflective metal fine elements 235 symmetrically and in parallel embedded in a transparent solid plate 238. The elongated parallel reflective metal fine elements 235 may be made of aluminum. Comparing with the existing multilayer polymeric film, such wire grid polarizer 230 has a wide optical receiving angle which can be sued for reflecting illumination from the light source 400 when the facing angle 209 is set to 45 degree. In addition, such wire grid polarizer 230 also has excellent heat tolerance so that the temperature of the wire grid polarizer 230 will not rise sharply along with increase of the illumination. Therefore, the wire grid polarizer 230 is invulnerable to intensive visible and infrared radiation so as to have better work stability.

As illustrated in FIG. 2, the light source 400 emits illumination light, including first illumination light 10 in a first polarization state 1 and second illumination light 20 in a second polarization state 2 orthogonal to the first polarization state 1, towards the PBS 200 along a first direction 51. The PBS 200, being set at a facing angle 209 with the first direction 51, is arranged to substantially reflect the first illumination light 10 in the first polarization state 1 and substantially transmitting the second illumination light 20 in the second polarization state 2. The PBS 200 is arranged at the facing angle 209 with the first direction 51 demonstrating a maximum ratio close to one between reflection of the first illumination light 10 in the first polarization state 1 to a second direction 52, and transmission of the second illumination light 20 in the second polarization state 2 continuously along the first direction 51.

The first modulation imager 110 includes a plurality of modulation imager pixels 105 in a regularly tiled planner arrangement as shown in FIG. 2. The first modulation imager 110 is constructed to: a) receive, as a first incident light 11 in the second direction 52, at least a portion of the first illumination light 10 in the first polarization state 1 reflected by the PBS 200; b) polarization modulate at least a portion of the first incident light 11 from the first polarization state 1 to the second polarization state 2; c) reflect polarization modulated light, as a first polarization modulated light 12 in the second polarization state 2, back to the PBS 200, and then the PBS 200 transmits the first polarization modulated light 12 as a first projection light 13 in the second polarization state 2 along a fourth direction 62 parallel and opposite to the second direction 52.

The second modulation imager 120, in an identical configuration of the modulation imager pixels 105 to the first modulation imager 110 symmetric to the PBS 200 and facing the light source 400 is arranged to: a) receive, as a second incident light 21, at least a portion of the second illumination light 20 in the second polarization state 2 transmitted through the PBS 200 in the first direction 51; b) polarization modulate at least a portion of the second incident light 21 from the second polarization state 2 to the first polarization state 1; and c) reflect polarization modulated light, as a second polarization modulated light 22 in the first polarization state 1, back to the PBS 200 in a third direction 61 parallel and opposite to the first direction 51.

Alternatively, the two modulation imagers, i.e., the first modulation imager 110 and the second modulation imager 120, can be further capped with an identical but symmetric color filter array on top of their modulation imager pixels 105 for constructing the color scheme of overlapped images to be projected and displayed on the projection screen 390. The first modulation imager 110 and the second modulation imager 120 are liquid crystal on silicon microdisplay panel, and the second modulation imager 120 is in an identical but symmetric planner geometric configuration to the first modulation imager 110.

In the present embodiment, two identical LCOS imagers are used as the first polarization modulation imager 110 and the second modulation imager 120, configured and arranged in a full spatial symmetry relative to the PBS 200. Such identical and symmetrically pairing LCOS modulation imagers 110 and 120 provide polarization modulation and reflection on incident polarization light while changing polarization preferably by 90 degree, either from the first polarization state 1 to the second polarization state 2 or vise versa.

The PBS 200 reflects the second polarization modulated light 22 in the first polarization state 1 as a second projection light 23 in the fourth direction 62; the first modulation imager 110 and the second modulation imager 120 are spatially aligned such that the first projection light 13 is overlapped with the second projection light 23 along the fourth direction 62, towards a projection lens system 300, opposite to the first modulation imager 110. The projection lens system 300 is arranged to: a) receive at a least a portion of the first projection light 13 in the second polarization state 2 and at least a portion of the second projection light 23 in the first polarization state 1, both along the fourth direction 62; and b) project an overlapped beam including the first projection light 13 in the second polarization state 2 and the second projection light 23 in the first polarization state 1 both onto a projection screen 390.

A control instruction provider 600, also as illustrated in FIG. 2, provides both a first series of modulation instructions 610 to the first modulation imager 110 for polarization modulating the first incident light 11 in the first polarization state 1 and a second series of modulation instructions 620 to the second modulation imager 120 for polarization modulating the second incident light 21 in the second polarization state 2, wherein the first series of modulation instructions 610 is in constant synchronization with the second series of modulation instructions 620 for achieving a full spatial symmetry of image modulation on the pairing modulation imagers (i.e. the first modulation imager 110 and the second modulation imager 120) relative to the PBS 200. Such symmetric configuration facilitates the fully aligned overlap on the projection screen 390 between the projected image 110a'-110b' optically amplified and projected from the original image 110a-110b generated on the first modulation imager 110 and the projected image 120a'-110b' optically amplified and projected from the original image 120a-110b generated on the second modulation imager 120, as illustrated in FIG. 2.

In the present embodiment, for improving the total optical efficiency of the optical projection engine device 500 towards the projection screen 390, the first series of modulation instructions 610 is taken as identical to second series of modulation instructions 620 symmetrically relative to the PBS 200. Thus, both the first incident light 11 in the first polarization state 1 and the second incident light 21 in the second polarization state 2 are utilized to generate the modulated images from the pairing modulation imagers (i.e., the first modulation imager 110 and the second modulation imager 120). Eventually, two beams of projection light for image display, the first projection light 13 and the second projection light 23, are introduced onto the projection screen 390, improving the overall brightness and contrast of the projected and overlapped images.

In another extraordinary aspect of the present embodiment, the first series of modulation instructions 610 and the second series of modulation instructions 620 of the same optical projection engine device 500 can be used for jointly constructing a pair of stereoscopic images of a three dimensional scene, represented as a stereoscopic three dimensional display being projected through the projection lens system 300 onto a projection screen 390. Such two sets of stereoscopic images, the first projected image 110a'-110b' in the second polarization state 2 and the second projected image 120a'-120b' in the first polarization state 1, are formed by overlapping the first projection light 13 in the second polarization state 2 and the second projection light 23 in the first polarization state 1 in constant synchronization, while the first projection light 13 and the second projection light 23 are generated by introducing the first series of modulation instructions 610 and the second series of modulation instructions 620 corresponding to the pair of the miniaturized stereoscopic images, the first original image 110a-110b on the first modulation imager 110 and the second original image 120a-120b on the second modulation imager 120 respectively, from the control instruction provider 600 to the first modulation imager 110 and the second modulation imager 120 in constant synchronization, to eventually display on the projection screen 390 through such optical amplification and projection. The displayed images on the projection screen 390, i.e., the first projected image 110a'-110b' in the second polarization state 2 originated from the first modulation imager 110 and the second projected image 120a'-120b' in the first polarization state 1 originated from the second modulation imager 120, projected in the two orthogonal polarization states on the projection screen 390 can be viewed with help from a pair of eye glasses in the two corresponding orthogonal polarization states.

Figure 3:
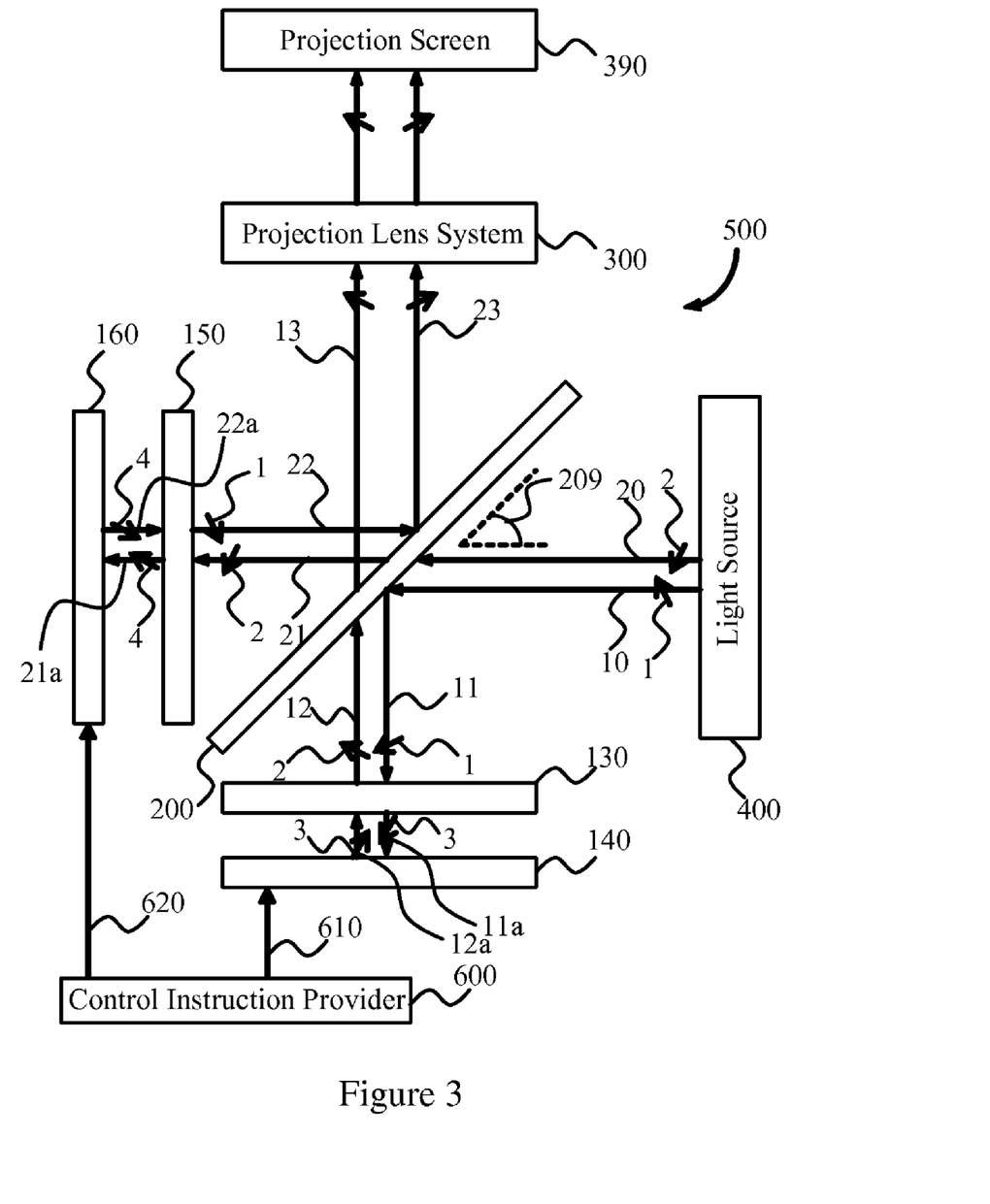
FIG. 3 illustrates a basic configuration of the optical projection engine device in Embodiment 2 of the disclosed invention.

FIG. 3 illustrates a basic configuration of the optical projection engine device in Embodiment 2 of the disclosed invention. The first modulation imager 110 in the optical projection engine device 500 may include a first polarization shift plate 130 and a first intensity modulation imager 140; and the second modulation imager 120 may include a second polarization shift plate 150 and a second intensity modulation imager 160 wherein summation of the first polarization shift degree and the second polarization shift degree equal to 90 or 270 degree. The first polarization shift plate 130 further transmits and polarizes the first incident light 11 in the first polarization state 1 to a first polarization shifted incident light 11a in a third polarization state 3 by a first polarization shift degree relative to the first polarization state 1. The first intensity modulation imager 140 intensity modulates and reflects the first polarization shifted incident light 11a in the third polarization state 3 to a first polarization shift modulation reflected light 12a also in the third polarization state 3. The first polarization shift plate 130 transmits and by a second polarization shift degree, polarizes the first polarization shift modulation reflected light 12a to the first polarization modulated light 12 in the second polarization state 2.

Operating in a spatial symmetry, the second polarization shift plate 150 transmits and polarizes the second incident light 21 in the second polarization state 2 to a second polarization shifted incident light 21a in a fourth polarization state 4 by a third polarization shift degree relative to the second polarization state 2. Meanwhile, the second intensity modulation imager 160 intensity modulates and reflects the second polarization shifted incident light 21a in the fourth polarization state 4 to a second polarization shift modulation reflected light 22a also in the fourth polarization state 4 wherein summation of the first polarization shift degree and the second polarization shift degree equal to 90 or 270 degree. The second polarization shift plate 140 further transmits and by a fourth polarization shift degree, polarizes the second polarization shift modulation reflected light 22a in the fourth polarization state 4 to the second polarization modulated light 22 in the first polarization state 1.

Micro electrical-mechanical interferometric pixel array devices, or Galvanic light valve (GLV) array devices, are examples of the pairing intensity modulation imagers (i.e., the first intensity modulation imager 140 and the second intensity modulation imager 160) used for the optical projection engine device 500 in the present embodiment, in association with the pairing polarization shift plates (the first polarization shift plate 130 and the second polarization shift plate 150). Such pixel array devices provide the needed reflective intensity modulation on the incident illumination, either polarized or non polarized light as described above and illustrated in FIG. 3.

Figure 4:
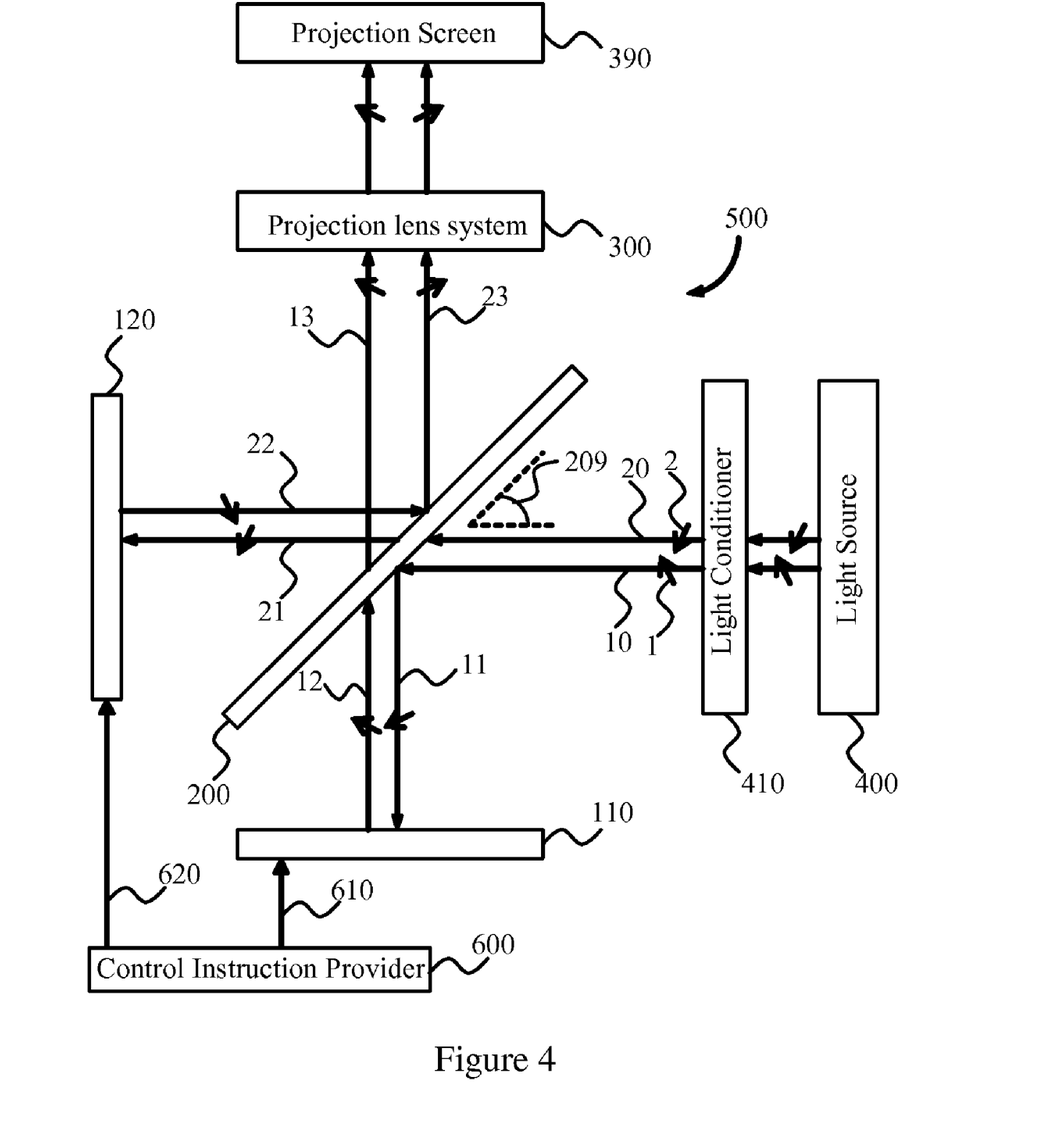
FIG. 4 illustrates a basic configuration of the optical projection engine device in Embodiment 3 of the disclosed invention.

FIG. 4 illustrates a basic configuration of the optical projection engine device in Embodiment 3 of the disclosed invention. In addition to the light source 400, the optical projection engine device 500 incorporates a light conditioner 410 adapted to condition light emitted from the light source 400 as combined illumination of the first illumination light 10 in the first polarization state 1 and the second illumination light 20 in the second polarization state 2 towards the PBS 200. Light is provided by the light source 400 and conditioned by the light conditioner 410 before illuminating the PBS 200, which changes the characteristics of the light emitted by the light source 400 to characteristics that are desirable for the projection display. For example, the light conditioner 410 may modify the divergence of the light, the polarization state of the light, the spectrum of the light, or any combination of these characteristics. The light conditioner 410 may include one or more lenses to change the divergence of the light, a polarization converter and/or a pre-polarizer to provide light in a particular polarization state, and/or a filter to remove unwanted ultraviolet and/or infrared light, or any combination of these components. In addition, the light conditioner 410 may also include an integrator, such as a tunnel integrator for uniformizing the intensity of the light across the light beam guided towards the PBS 200.

Figure 5:
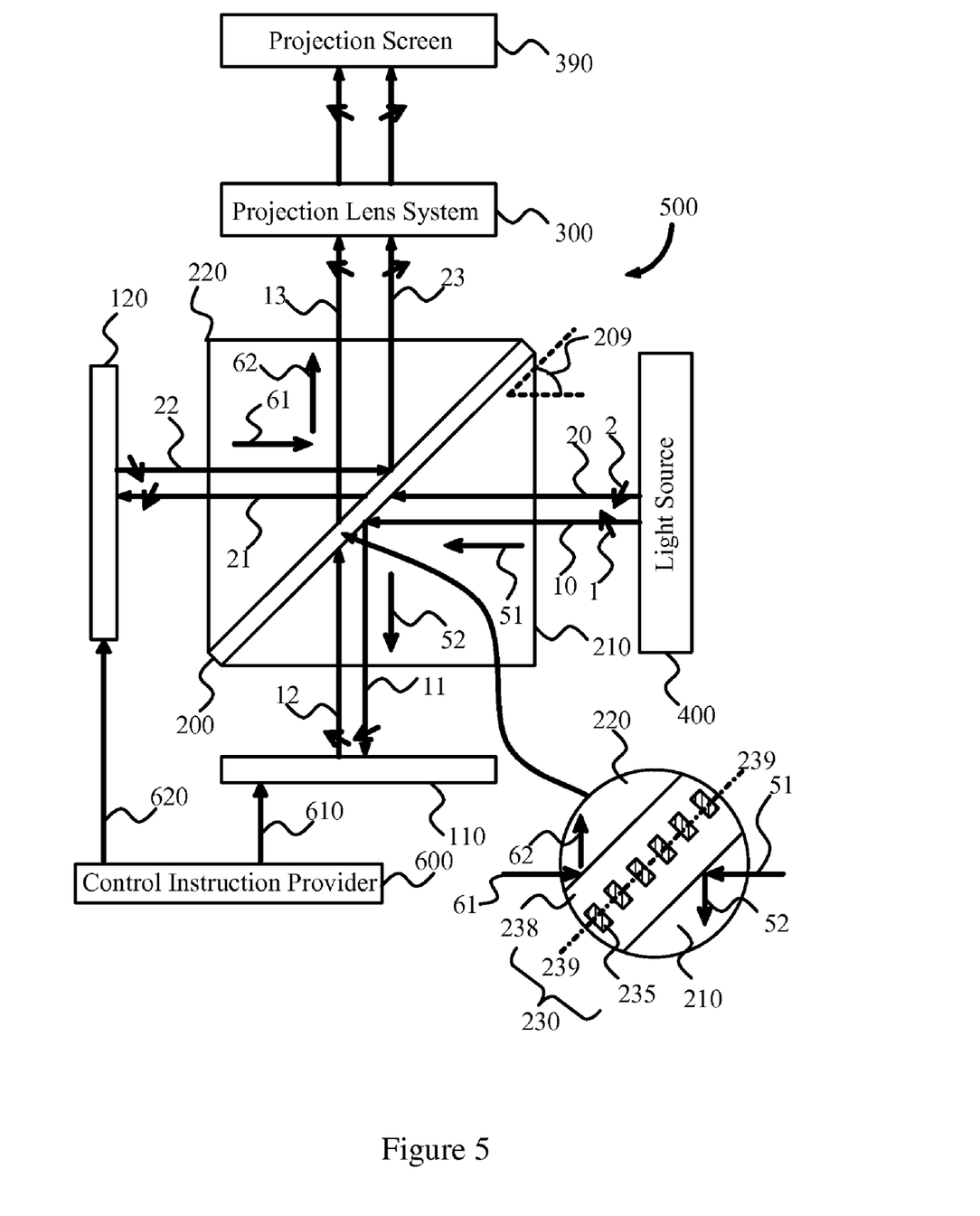
FIG. 5 illustrates a basic configuration of the optical projection engine device in Embodiment 4 of the disclosed invention.

FIG. 5 illustrates a basic configuration of the optical projection engine device in Embodiment 4 of the disclosed invention. The optical projection engine device 500 incorporates a pair of prisms, i.e., the first prism 210 and the first prism 220 for sandwiching and forming a square optical engine core with PBS 200 with the facing angle close to 45 degree. Thus, the wire grid polarizer 230 as sandwiched by the first prism 210 and the second prism 220 is physically symmetric relative to its central plane 239 and performs the symmetric reflection and transmission on its both sides, relative to the first pair of the first direction 51 for incident and the second direction 52 for reflection on one side and the second pair of the third direction 61 for incident and the fourth direction 62 for reflection on the other side of the wire grid polarizer 230. Preferably, the pair of prisms 210 and 220 is made from a fine polished glass cuts and the transparent solid plate 238 is made of silicon dioxide with adequate optical indices and thicknesses.

Figure 6:
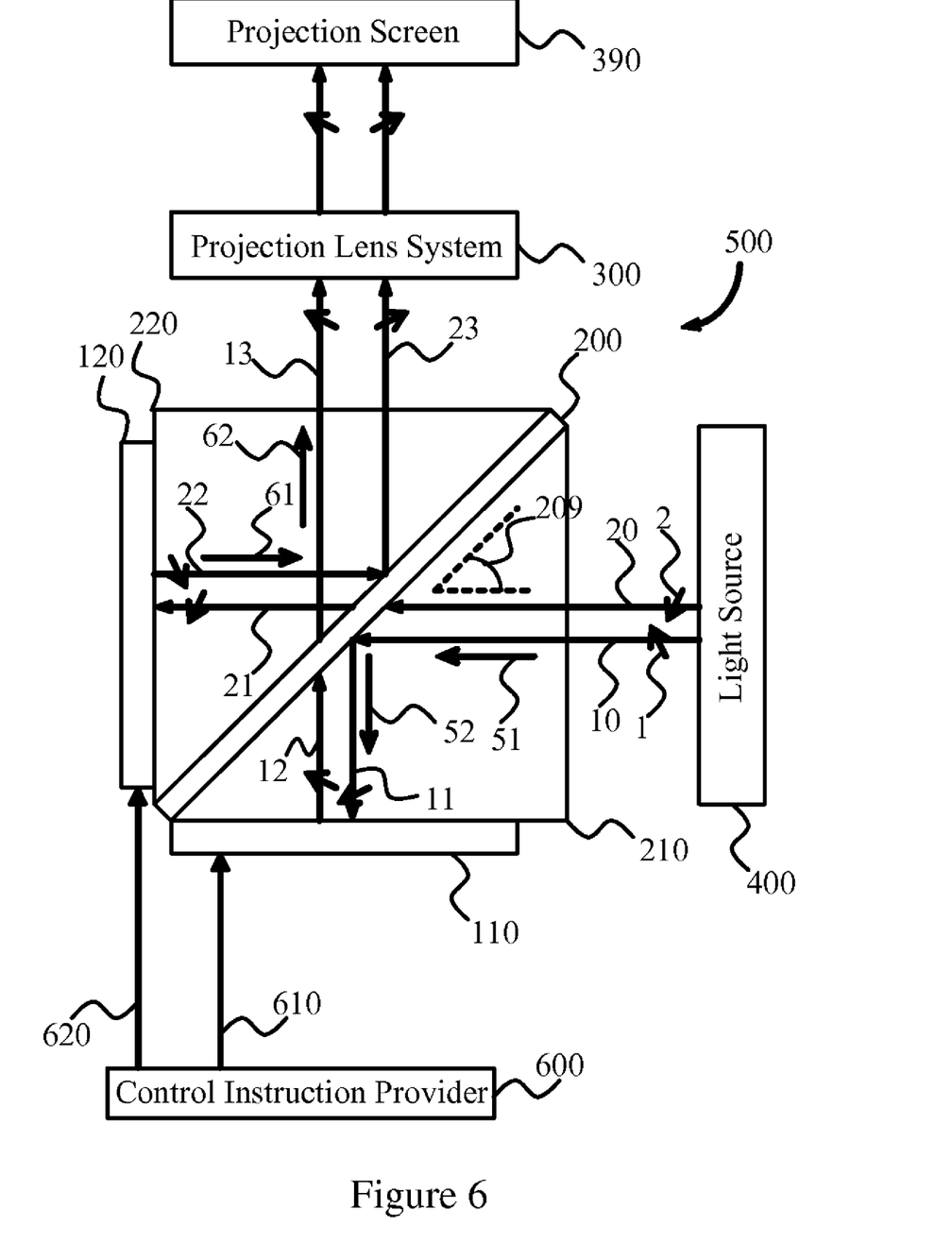
FIG. 6 illustrates a basic configuration of the optical projection engine device in Embodiment 5 of the disclosed invention.

FIG. 6 illustrates a basic configuration of the optical projection engine device in Embodiment 5 of the disclosed invention. The optical projection engine device 500 is in a compact arrangement in which the first modulation imager 110 is further adequately attached to the corresponding face of the first prism 210 facing the projection lens system 300 and the second modulation imager 120 is further adequately attached to the corresponding face of the second prism 220 facing the light source 400. Thus a very compact square optical engine core is constructed, providing a substantially improved the physical integration of all the core components to the optical projection engine device 500 and the optical performance of the whole optical projection engine device 500. The first modulation imager 110 and the second modulation imager 120 are firmly mounted to the first prism 210 and the second prism 220 as one bonded solid block which sandwiches the PBS 200 in diagonal. Specifically, the first modulation imager 110 may be mounted to the first prism 210 on opposite face to the projection lens system 300, and the second modulation imager 120 mounted to the second prism 220 on opposite face to the light source 400.

The light source 400 in the optical projection engine device 500 as disclosed and exemplified above can be any suitable light source including conventional light sources such as, for example, arc lamps, tungsten lamps, halide lamps and the alike, and alternatives such as light emitting diodes and lasers.

The present disclosure should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. An optical projection engine device, comprising:
    a light source, adapted to emit first illumination light in a first polarization state and second illumination light in a second polarization state orthogonal to the first polarization state along a first direction;
    a polarizing beam splitter (PBS), adapted to reflect the first illumination light in the first polarization state and transmit the second illumination light in a second polarization state, the PBS being set at a facing angle with the first direction demonstrating a maximum ratio close to one between reflection of the first illumination light in the first polarization state and transmission of the second illumination light in the second polarization state, wherein the PBS is a wire grid polarizer made of elongated parallel reflective metal fine elements symmetrically embedded in a transparent solid plate;
    a first modulation imager, comprising a plurality of modulation imager pixels in a regularly tiled planner arrangement, adapted to: a) receive, as a first incident light in a second direction, at least a portion of the first illumination light in the first polarization state reflected by the PBS; b) polarization modulate at least a portion of the first incident light from the first polarization state to the second polarization state; c) reflect polarization modulated light, as a first polarization modulated light in the second polarization state, back to the PBS which transmits the first polarization modulated light as a first projection light in the second polarization state;
    a second modulation imager, in an identical configuration of modulation imager pixels to the first modulation imager, adapted to: a) receive, as a second incident light, at least a portion of the second illumination light in the second polarization state transmitted through the PBS; b) polarization modulate at least a portion of the second incident light from the second polarization state to the first polarization state; and c) reflect polarization modulated light, as a second polarization modulated light in the first polarization state, back to the PBS in a third direction, the PBS reflecting the second polarization modulated light in the first polarization state as a second projection light in a fourth direction; wherein the first modulation imager and the second modulation imager are spatially aligned such that the first projection light is overlapped with the second projection light along the fourth direction;
    a projection lens system, opposite to the first modulation imager, adapted to: a) receive at a least a portion of the first projection light in the second polarization state and at least a portion of the second projection light in the first polarization state 1; and b) project an overlapped beam comprising the first projection light in the second polarization state and the second projection light in the first polarization state onto a projection screen; and
    a control instruction provider, adapted to provide in synchronization a first series of modulation instructions to the first modulation imager and a second series of modulation instructions to the second modulation imager.

2. The device according to claim 1, wherein the first series of modulation instructions is in constant synchronization with the second series of modulation instructions for achieving a full spatial symmetry of image modulation on the first modulation imager and the second modulation imager relative to the PBS.

3. The device according to claim 1, wherein the first series of modulation instructions and the second series of modulation instructions are adapted to jointly construct a pair of stereoscopic images of a three dimensional scene, represented as a stereoscopic three dimensional display being projected through the projection lens system onto the projection screen, comprising two sets of images formed respectively by the first projection light in the second polarization state and the second projection light in the first polarization state.

4. The device according to claim 1, wherein the first modulation imager and the second modulation imager are liquid crystal on silicon microdisplay panel and the second modulation imager is in an identical but symmetric planner geometric configuration to the first modulation imager.

5. The device according to claim 1, wherein the first modulation imager comprises:
    a first polarization shift plate, adapted to transmit and polarize the first incident light in the first polarization state to a first polarization shifted incident light in a third polarization state by a first polarization shift degree relative to the first polarization state; and
    an first intensity modulation imager, adapted to intensity modulate and reflect the first polarization shifted incident light in the third polarization state to a first polarization shift modulation reflected light still in the third polarization state;

wherein summation of the first polarization shift degree and the second polarization shift degree equal to 90 or 270 degree, and the first polarization shift plate is further adapted to transmit and by a second polarization shift degree, polarize the first polarization shift modulation reflected light to the first polarization modulated light in the second polarization state.

6. The device according to claim 5, wherein the first intensity modulation imager comprises an array of micro electrical-mechanical interferometric pixels.

7. The device according to claim 1, wherein the second modulation imager comprises:
  a second polarization shift plate, adapted to transmit and polarize the second incident light in the second polarization state to a second polarization shifted incident light in a fourth polarization state by a third polarization shift degree relative to the second polarization state; and
  a second intensity modulation imager, adapted to intensity modulating and reflect the second polarization shifted incident light in the fourth polarization state to a second polarization shift modulation reflected light still in the polarization state 4;
  wherein summation of the first polarization shift degree and the second polarization shift degree equal to 90 or 270 degree, and the second polarization shift plate is further adapted to transmit and by a second polarization shift degree, polarize the second polarization shift modulation reflected light to the second polarization modulated light in the first polarization state.

8. The device according to claim 7, wherein the second intensity modulation imager comprises an array of micro electrical-mechanical interferometric pixels.

9. The device according to claim 1, wherein the PBS is further sandwiched by a first prism and second prism, forming a square optical engine core with the facing angle close to 45 degree.

10. The device according to claim 9, wherein the first prism and the second prism are made from fine-polished glass cuts.

11. The device according to claim 9, wherein the first modulation imager is mounted to the first prism on opposite face to the projection lens system, and the second modulation imager mounted to the second prism on opposite face to the light source.

12. The device according to claim 1, wherein within the wire grid polarizer, the elongated parallel reflective metal fine elements are made of aluminum and the transparent solid plate is made from silicon dioxide.

13. The device according to claim 1, wherein the first modulation imager and the second modulation imager both further comprise an identical color filter array being aligned and overlapped with the plurality of modulation imager pixels in a mirror symmetry to the PBS.

14. The device according to claim 1, wherein the device further comprises a light conditioner, adapted to condition light emitted from the light source as combined illumination of the first illumination light in the first polarization state and the second illumination light in the second polarization state towards the PBS.

15. The device according to claim 1, wherein the light source is generated by any one or combination of arc lamps, tungsten lamps, halide lamps, light emitting diodes, and lasers.

* * * * *